US011720757B2

(12) United States Patent
Bahirwani et al.

(10) Patent No.: US 11,720,757 B2
(45) Date of Patent: Aug. 8, 2023

(54) EXAMPLE BASED ENTITY EXTRACTION, SLOT FILLING AND VALUE RECOMMENDATION

(71) Applicant: Microsoft Technology Licensing, LLC, Redmond, WA (US)

(72) Inventors: Vikas Bahirwani, Seattle, WA (US); Jade Huang, Bellevue, WA (US); Matthew Brigham Hall, Kenmore, WA (US); Yu Zhao, Redmond, WA (US); Pengcheng He, Sammamish, WA (US); Weizhu Chen, Kirkland, WA (US); Eslam K. Abdelreheem, Sammamish, WA (US); Jiayuan Huang, Medina, WA (US); Yuting Sun, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 297 days.

(21) Appl. No.: 16/543,794

(22) Filed: Aug. 19, 2019

(65) Prior Publication Data
US 2021/0056169 A1 Feb. 25, 2021

(51) Int. Cl.
*G06F 40/35* (2020.01)
*G06F 40/117* (2020.01)
(Continued)

(52) U.S. Cl.
CPC .......... *G06F 40/35* (2020.01); *G06F 40/117* (2020.01); *G06F 40/295* (2020.01); *G06N 3/08* (2013.01); *G06N 20/00* (2019.01); *H04L 51/02* (2013.01)

(58) Field of Classification Search
None
See application file for complete search history.

(56) References Cited

U.S. PATENT DOCUMENTS 8,594,996 B2  11/2013  Liang et al.
9,971,763 B2   5/2018  Abdel-Reheem et al.
(Continued)

FOREIGN PATENT DOCUMENTS

WO    2018236332 A1   12/2018

OTHER PUBLICATIONS

U.S. Appl. No. 62/865,030 filed Jun. 2019, Ardhanari, Murali.*
(Continued)

*Primary Examiner* — Richa Mishra
(74) *Attorney, Agent, or Firm* — Weaver IP L.L.C.

(57) ABSTRACT

Methods, systems, apparatuses, and computer program products are provided for extracting an entity value from a sentence. An embedding set that may include one or more sentence embeddings is generated for at least part of a first sentence that is tagged to associate a first named entity in the sentence with an entity type. A plurality of candidate embeddings is also generated for at least part of a second sentence. The one or more sentence embeddings in the embedding set may be compared with each of the plurality of candidate embeddings, and a match score may be assigned to each comparison to generate a match score set. A particular match score of the match score set may be identified that exceeds a similarity threshold, and an entity value of the entity type may be extracted from the second sentence associated with the identified match score.

20 Claims, 6 Drawing Sheets

(51) Int. Cl.
*G06F 40/295* (2020.01)
*H04L 51/02* (2022.01)
*G06N 3/08* (2023.01)
*G06N 20/00* (2019.01)

(56) References Cited

U.S. PATENT DOCUMENTS

| | | | |
|---|---|---|---|
| 9,977,778 | B1 | 5/2018 | Perez et al. |
| 10,191,999 | B2 | 1/2019 | Liu et al. |
| 2016/0357855 | A1* | 12/2016 | Fan ................... G06F 16/3329 |
| 2017/0337478 | A1* | 11/2017 | Sarikaya ................. G06F 40/35 |
| 2018/0121415 | A1 | 5/2018 | Perez et al. |
| 2018/0232376 | A1 | 8/2018 | Zhu et al. |
| 2019/0066660 | A1 | 2/2019 | Liang et al. |
| 2019/0073353 | A1* | 3/2019 | Yu ............................ G06V 10/82 |
| 2019/0103092 | A1 | 4/2019 | Rusak et al. |
| 2019/0332658 | A1* | 10/2019 | Heckel ................. G06F 21/6245 |
| 2020/0202846 | A1* | 6/2020 | Bapna .................. G10L 15/1815 |
| 2020/0250139 | A1* | 8/2020 | Muffat .................. G06N 3/0454 |
| 2020/0402625 | A1* | 12/2020 | Aravamudan ......... G16H 10/60 |

OTHER PUBLICATIONS

"International Search Report and Written Opinion Issued in PCT Application No. PCT/US20/037106", dated Sep. 16, 2020, 14 Pages.

Gregori, Eric, "Evaluation of Modern Tools for an OMSCS Advisor Chatbot", Retrieved From: https://smartech.gatech.edu/bitstream/handle/1853/58516/evaluation_of_modern_tools_for_an_omscs_advisor_chatbot%281%29.pdf?sequence=1&isAllowed=y, Aug. 2017, 50 Pages.

Louvan, et al., "From General to Specific: Leveraging Named Entity Recognition for Slot Filling in Conversational Language Understanding", In Proceedings of Fifth Italian Conference on Computational Linguistics, Dec. 10, 2018, 6 Pages.

Surdeanu, et al., "Stanford's Distantly-Supervised Slot-Filling System", In Proceedings of Text Analysis Conference, Nov. 14, 2011, 6 Pages.

Talukdar, et al., "A Context Pattern Induction Method for Named Entity Extraction", In Proceedings of the Tenth Conference on Computational Natural Language Learning, Jun. 8, 2006, 8 Pages.

\* cited by examiner

EXAMPLE BASED ENTITY EXTRACTION, SLOT FILLING AND VALUE RECOMMENDATION

BACKGROUND

Virtual agents, such as chat bots, may be utilized in a variety of customer support contexts to simulate natural conversations with humans. In typical systems, a user query is parsed to extract various values present in the query. The values may include an entity value, such as the name of a person, location, organization, etc. In some systems, slot values can also be extracted from the user query, which may comprise a value for a slot type that is defined with respect to an underlying entity type. In other words, slot values may be identified to enable a more granular categorization of entity values that are present in a query (e.g., by defining slot types "origin" and "designation" for an underlying entity type "location"). Upon extraction of such entity and/or slot values, virtual agents may better understand the user query and determine an appropriate response. In one conventional system, classification models may be employed to extract entity or slot values from user queries by classifying words or phrases in a user query (e.g., an input sentence) as belonging to a predefined set of entity types or slot types. However, where a new entity type or slot type is desired to be added to the classification model, the models need to be retrained to support the new classifications, which can require significant time and resources.

In another approach for extracting values from a user query, a bag-of-words model may be used to match words present in the user query with a large set of known (e.g., pre-identified) words. In other words, by searching one or more words in the user query in the set of known words, entity values can be extracted from the query. For instance, if the set of known words comprised a listing of thousands of cities, a user query could be parsed to extract cities therein by matching words of the query against the set of known words. However, assembling or acquiring a large set of data in such an approach is typically overly burdensome and time-consuming, and adding new terms to the set could add unnecessary delays that may impede the adoptability of such an approach. Further, even if such data is manually edited to add new words that may be matched against words in user queries, it is still difficult to compile a set of words that is comprehensive enough to extract different types of values from a user query. As a result, even where a large set of known words is utilized, the quality of value extraction can still be poor.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for extracting an entity value from a sentence. An embedding set that may include one or more sentence embeddings is generated for at least part of a first sentence (e.g., an example sentence) that is tagged to associate a first named entity in the sentence with an entity type. A plurality of candidate embeddings is also generated for at least part of a second sentence (e.g., a user sentence). The one or more sentence embeddings in the embedding set may be compared with each of the plurality of candidate embeddings, and a match score may be assigned to each comparison to generate a match score set. A particular match score of the match score set may be identified that exceeds a similarity threshold, and an entity value of the entity type may be extracted from the second sentence associated with the identified match score. In this manner, a new entity type may be defined using an example sentence, and an entity value may be extracted from a user sentence based on an example sentence quickly and efficiently.

Further features and advantages of the disclosed subject matter, as well as the structure and operation of various example embodiments, are described in detail below with reference to the accompanying drawings. It is noted that the disclosed subject matter is not limited to the specific embodiments described herein. Such example embodiments are presented herein for illustrative purposes only. Additional example embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
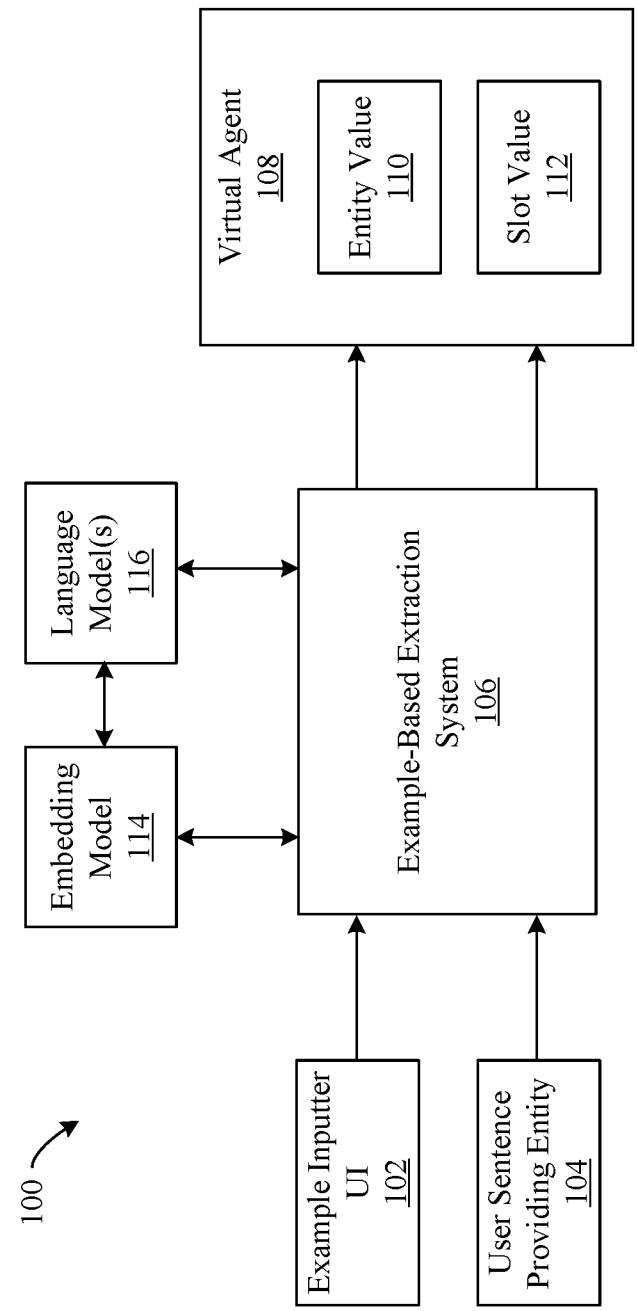
FIG. 1 shows a block diagram of an example-based extraction system, according to an example embodiment.

The features and advantages of the disclosed subject matter will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more example embodiments that incorporate the features of the disclosed subject matter. The scope of the disclosed subject matter is not limited to the example embodiments described herein. The example embodiments merely exemplify the disclosed subject matter, and modified versions of the disclosed embodiments are also encompassed. Example embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the example embodiment for an application for which it is intended.

Numerous example embodiments are described as follows. It is noted that any section/subsection headings provided herein are not intended to be limiting. Example embodiments are described throughout this document, and any type of embodiment may be included under any section/subsection. Furthermore, example embodiments disclosed in any section/subsection may be combined with any other embodiments described in the same section/subsection and/or a different section/subsection in any manner.

II. Example Implementations

Virtual agents, such as chat bots, may be utilized in a variety of customer support contexts to simulate natural conversations with humans. In typical systems, a user query is parsed to extract various values present in the query. An extracted value may include any word (or sequence of words) of a query that may have importance. In other words, an extracted value of a user query may comprise a subset of words present in the actual user query that are determined to be important in the context of the query. In some instances, the values may include an entity value and a slot value. As used herein, an entity value refers to the value of an entity type as recited in a sequence of words, such as a sentence. An entity type may refer to a type of an object that may exist in a given sentence. For instance, an entity value may be the name of a person, location, organization, etc., as it is recited in a sentence. As an illustration, if an entity type is a location, the cities "New York City" and "Los Angeles" present in a user query could be identified as entity values of the entity type "location." In some systems, slot values can also be identified from the user query. As used herein, a slot value refers to the value of a slot type. A slot type can be defined with respect to an underlying entity type. For instance, a slot type may be defined as a subsidiary of an entity type. In the illustration above, a slot type "origin" may be defined as an origin location of the entity type "location," while a slot type "destination" could be defined as a destination location of the entity type "location." Thus, while both "New York City" and "Los Angeles" are entity values of the entity type "location" in the illustration, "New York City" may further be identified as a slot value for the slot type "origin" and "Los Angeles" may be identified as the slot value for the slot type "destination."

Upon extraction of such entity or slot values, virtual agents may better understand the user query and may determine an appropriate response, such as by matching the extracted entity values to a set of possible responses. In one conventional system, classification models may be employed to extract entity or slot values by classifying words or phrases in a user query (e.g., an input sentence) as belonging to a predefined set of entity types or slot types. However, where a new entity type or slot type is desired to be added to the classification model, the models need to be retrained with a large set of labeled training data to support the new classifications, which can require significant time and resources. In some instances, such training data can comprise tens of thousands of labeled sentences in order to render the classification model effective.

In another approach for extracting values from a user query, a bag-of-words model may be used to match words present in the user query with a large set known (e.g., pre-identified) words. In other words, by searching one or more words in the user query in the set of known words, entity values can be extracted from the query. For instance, if the set of known words comprised a listing of thousands of cities, a user query could be parsed to extract cities therein by matching words of the query against the set of known words. However, assembling or acquiring a large set of data in such an approach is typically overly burdensome and time-consuming, and adding new terms to the set could add unnecessary delays that may impede the adoptability of such an approach. Further, even if such data is manually edited to add new words that may be matched against words in user queries, it is still difficult to compile a set of words that is comprehensive enough to extract different types of values from a user query. As a result, even where a large set of known words is utilized, the quality of value extraction can still be poor.

Embodiments described herein address these and other issues by providing systems and methods for providing streamlined techniques for adding new types of terms that are expected to be present in user sentences and identifying terms of the user sentences associated with the newly defined types. In this manner, systems that may rely on user-provided inputs, such as virtual agents, can utilize an expanded set of types of terms from user inputs. As a result, not only will the systems that rely on user inputs be able to better understand details in user inputs, such systems will be enabled to carry out more meaningful actions in response to user inputs. Furthermore, because the types of terms that may be found in user sentences can easily be added, modified, and/or refined by providing a relatively small set of sentences illustrating the usage of those types of terms, updates to entity recognition systems can easily be achieved with reduced delay.

In an example system, defining an entity type and extracting entity values of that entity type may be carried using an embedding model that may generate an embedding for a word or sequence of words. An embedding as used herein refers to a representation of a word or sequence of words. The representation may comprise a vector or other set of real numbers in a multi-dimensional space. An embedding generator may generate an embedding set that includes one or more sentence embeddings generated for at least part of a first sentence (e.g., an example sentence) that is tagged to associate a first named entity in the sentence with an entity type. The embedding generator may also be configured to generate a plurality of candidate embeddings for at least part of a second sentence (e.g., a user inputted sentence, such as a user query). An embedding comparer may compare each of the one or more sentence embeddings in the embedding set with each of the plurality of candidate embeddings, assign a match score to each comparison to generate a match score set. An entity value extractor may identify a particular match score of the match score set that exceeds a similarity threshold, and extract an entity value of the entity type from the second sentence associated with the identified match score.

Extracting an entity value from a sentence as described herein has numerous advantages, including but not limited to enabling the definition of new entity types and extracting entity values of the entity type quickly and efficiently. For instance, because an embedding generator may be utilized to generate embeddings for an example sentence (or a plurality of example sentences) as well as a user inputted sentence, the generated embeddings may be compared against each other to identity a particular match that exceeds a similarity threshold. As a result, an entity value may be extracted from the user sentence without retraining a model (such as an embedding model that may applied to generate embeddings as described herein). In other words, entity values (or slot values, as described below) may be extracted immediately, or almost immediately, once new types are defined through a relatively small set of tagged example sentences (or even a single example sentence).

Since model retraining is not required even where new entity types are introduced, computing resources (e.g., processing, memory, etc.) to train, load, unload, retrain, etc. models in a recurring fashion may be avoided. Rather, new entity types may be defined through one or more example sentences in which a named entity in the sentence may be tagged with the new entity type. Based on the tagged example sentence, one or more embeddings (e.g., vector representations) that represent the example sentence may be generated and compared against embeddings generated from user queries to extract entity values of the new entity type. Still further, since retraining of models is not necessary when new entity types are defined, entity values may be extracted much more quickly.

Furthermore, example embodiments described herein may also enable a reduction in the number of models employed in an entity extraction system overall. For instance, in some other techniques such as where classification models may be relied upon to extract entities, each customer (e.g., client, subscriber, etc.) implementing an entity extraction system may need to train their respective classification models separately based on their organization, which not only requires a large set of training data that may be unique to each organization, but also separately loading and retraining such models for each individual customer. With example embodiments described herein, the same embedding model may be implemented across different customers, which may result in a further reduction of processing, storage and/or memory resources.

Example embodiments are described as follows for systems and methods for extracting an entity value from a sentence. For instance, FIG. 1 shows a block diagram of a system 100 for extracting an entity value based on example sentences, according to an example embodiment. As shown in FIG. 1, system 100 includes an example inputter user interface (UI) 102, a user sentence providing entity 104, an example-based extraction system 106, a virtual agent 108, an embedding model 114, and one or more language model(s) 116. Virtual agent 108 may receive an entity value 110 and a slot value 112 extracted from a user sentence by example-based extraction system 106. For instance, as described in greater detail below example-based extraction system 106 may obtain one or more example sentences via example inputter UI 102, as well as a user sentence from user sentence providing entity 104. Example-based extraction system 106 may generate embeddings, as described herein, for at least parts of each obtained example sentence and user sentence using embedding model 114 and/or language model(s) 116. Based at least on a comparison of such embeddings, a match with a similarity score that exceeds a threshold value may be selected, and may extract entity value 110 and/or slot value 112. Although FIG. 1 is described as comprising the aforementioned arrangement, such an implementation is not intended to be limiting. Other arrangements are also contemplated that may enable example-based extraction system 106 to extract an entity value and/or a slot value from a user sentence. System 100 is further described as follows.

Although not expressly shown in FIG. 1, example inputter UI 102, user sentence providing entity 104, example-based extraction system 106, virtual agent 108, embedding model 114, and/or language model(s) 116 may be communicatively coupled to each other via one or more networks, including one or more of a local area network (LAN), a wide area network (WAN), a personal area network (PAN), a combination of communication networks, such as the Internet, and/or a virtual network. In an implementation, any one or more of example inputter UI 102, user sentence providing entity 104, example-based extraction system 106, virtual agent 108, embedding model 114, and/or language model(s) 116 may communicate via one or more application programming interfaces (API), and/or according to other interfaces and/or techniques. Example inputter UI 102, user sentence providing entity 104, example-based extraction system 106, virtual agent 108, embedding model 114, and/or language model(s) 116 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Example inputter UI 102 may be implemented on any computing device of one or more users (e.g., individual users, family users, enterprise users, governmental users, etc.) that may comprise one or more applications, operating systems, virtual machines, storage devices, etc. that may be used to provide authoring services to virtual agent 108. For instance, example inputter UI 102 may comprise one or more applications or software packages enabling a user to input example sentences to define one or more entity types that may be found within user sentences provided by user sentence providing entity 104. Example inputter UI 102 may be implemented on any number of computing devices, including tens, hundreds, thousands, millions, or even greater numbers of computing devices. Computing devices in which example inputter UI 102 may be implemented may each be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Such computing devices are not limited to a physical machine, but may include other types of machines or nodes, such as a virtual machine. Computing devices in which example inputter UI 102 may be implemented may each interface with example-based extraction system 106, virtual agent 108, embedding model 114, and/or language model(s) 116 through APIs and/or by other mechanisms. Note that any number of program interfaces may be present.

User sentence providing entity 104 may be any computing device of one or more users (e.g., individual users, family users, enterprise users, governmental users, etc.) that may comprise one or more applications, operating systems, virtual machines, storage devices, etc. that may be used to interact with virtual agent 108. For instance, user sentence providing entity 104 may provide one or more sentences (e.g., user queries or other interactions) that may be received by virtual agent 108. In some examples, user sentence providing entity 104 may comprise an interface coupled to an organization, such as a website, messaging application, email application, etc. in which a user may provide user sentences (e.g., customer support requests, etc.) to virtual agent 108. User sentence providing entity 104 may also be configured to receive one or more responses (not shown) from virtual agent 108 in response to the user sentences, such as messages, purchase confirmations, booking confirmations, emails, etc. Any number of instances of user sentence providing entity 104 may be present in system 100 to interact with virtual agent 108, including tens, hundreds, thousands, millions, or even greater numbers of computing devices. User sentence providing entity 104 may similarly be any type of stationary device, mobile computing device, physical machine, virtual machine, node, etc. as described herein. User sentence providing entity 104 may also interface with example-based extraction system 106 and/or virtual agent 108 through APIs and/or by other mechanisms.

Virtual agent 108 may comprise one or more services in which a chat bot or other automated or semi-automated interaction service may be implemented. For instance, virtual agent 108 may comprise a "chat bot," such as an artificial intelligence software program that may employ natural language processing techniques to simulate human interaction with end users (e.g., responding with information in a messaging interface, carry out one or more requested tasks, look up order or account information, etc.). Virtual agent 108 may comprise any interaction method, including but not limited to textual interaction and/or audible interaction. In example implementations, virtual agent 108 may be configured to simulate human interaction via applications of one or more language models, such as language model(s) 116, to parse received user sentences and determine the most appropriate action in response. Although example implementations are described herein in which example-based extraction system 106 may provide entity value 110 and/or slot value 112 to virtual agent 108, implementations are not so limited. Example-based extraction system 106 may be configured to provide entity value 110 and/or slot value 112 to other types of entity (e.g., other than virtual agent 108) that may receive a user input, such as a virtual assistant device, a home automation device, an entertainment or gaming system, etc.

As will be described in greater detail below, example-based extraction system 106 may be configured to extract entity value 110 and/or slot value 112 from a user sentence provided by user sentence providing entity 104. Entity value 110 and/or slot value 112 may comprise any entity present in a given sentence, such as an organization name, a name of person, a location, a date, clothing sizes, etc. Entity value 110 and/or slot value 112 can comprise a single word of a sentence or multiple sequential words (e.g., a word span). In some implementations, entity value 110 and/or slot value 112 may be identified using an Inside-Outside-Beginning (IOB) technique.

Example-based extraction system 106 may extract an entity of an entity type or a slot value of a slot type as defined by one or more example sentences obtained from example inputter UI 102. For instance, example-based extraction system 106 may generate embeddings using embedding model 114 for one or more example sentences that have been tagged to associate a named entity and an entity type.

Embedding model 114 may comprise a deep-learning model that may be configured to map a word or sequence of words to a numerical value, such as a multi-dimensional vector. Embedding model 114 may be trained based on an algorithm that utilizes language data that comprises the usage of words in a given language, such as books, academic literature, dictionaries, encyclopedias, data available on the Internet, newspapers, etc., language model(s) 116, and/or any other language data. In some implementations, embedding model 114 may be trained based on millions or billions of word or word combinations, and comprise hundreds or even thousands of dimensions.

Examples of algorithms that may be used to train embedding models include, but are not limited to Word2Vec, designed by Google LLC, Global Vector (GloVe) designed by Stanford University, fastText designed by Facebook, Inc. Furthermore, embedding model 114 may be trained using various types of learning techniques as will be appreciated to those skilled in the relevant arts, including but not limited to skip-gram, co-occurrence learning, negative sampling, etc. These example are illustrative only, and may include other algorithms for training embedding model 114, including any other natural language processing (NLP) methods appreciated to those skilled in the relevant arts.

Embedding model 114 may be generated in various forms. For instance, embedding model may be generated according to a suitable supervised and/or unsupervised machine-learning algorithm. For instance, embedding model 114 may be generated by implementing a vector space learning algorithm to generate the embedding model as a vector space model. As a vector space model, embedding model 114 may represent individual words or sequences of words in a continuous vector space (e.g., a multi-dimensional space), where similar words or sequences of words are mapped to nearby points or are embedded nearby each other. Furthermore, an artificial neural network learning algorithm may be used to generate and/or train embedding model 114 as a neural network that is an interconnected group of artificial neurons. The neural network may be presented with word or sequence of words to identify a representation of the inputted word or sequences of words. Embedding model 114 could be implemented using any suitable neural network architecture, such as FusionNet provided by Microsoft Corporation, although embodiments are not limited to this particular implementation.

When embedding model 114 is provided with an individual word, or a sequence of words, embedding model 114 may be configured to generate a vector representation of the word or sequence of words. In this way, embedding model 114 may be applied to generate an embedding for a single word, a word span that comprises several words, or an entire sentence (e.g., by combining one or more embeddings for individual words in the sentence). An embedding generated by applying embedding model 114 may comprise a vector representation, such as a vector matrix, or any other combination or sequence of values (e.g., numerical value and/or characters), that may be suitable to represent the usage or context of a particular word or sequence of words. For instance, an embedding for a sentence such as "I am traveling to Seattle" may comprise a vector representation that is based on a combination of embeddings for the words "I," "am," "traveling," "to," and "Seattle" in a particular order.

Example-based extraction system 106 may compare such embeddings with a plurality of candidate embeddings generated from a user sentence using embedding model 114 and language model 116. As described below, by comparing the various embeddings, an entity value or slot value may be extracted from the user sentence and provided to virtual agent 108. In a further implementation, example-based extraction system 106 may also be configured to provide authoring assistance to example inputter UI 102 by recommending one or more additional word spans for inclusion in additional example sentences.

It is noted and understood that implementations are not limited to the illustrative arrangement shown in FIG. 1. For instance, though one or more of the components shown in FIG. 1 are illustrated as separate from each other, any one or more of such components (or subcomponents) may be co-located, located remote from each other, may be implemented on a single computing device, or may be implemented on or distributed across one or more additional computing devices not expressly illustrated in FIG. 1. In addition, system 100 may comprise any number of computing devices and/or servers to implement the components (or subcomponents) of FIG. 1 and optionally one or more further devices not expressly illustrated.

Furthermore, although it is described herein that entity value 110 and/or slot value 112 may be extracted from a user sentence in accordance with an example-based extraction, other extraction techniques are also contemplated. For instance, entity value 110 and/or slot value 112 may be extracted from a user sentence using other extraction models as will be appreciated by those skilled in the art, such as a rule-based extraction technique (e.g., using key phrases), classification models, named entity recognition (NER) using conditional random field (CRF) models, etc. In some example embodiments, a combination of techniques, including example-based extraction techniques described herein, may be implemented to extract entity value 110 and/or slot value 112.

Figure 2:
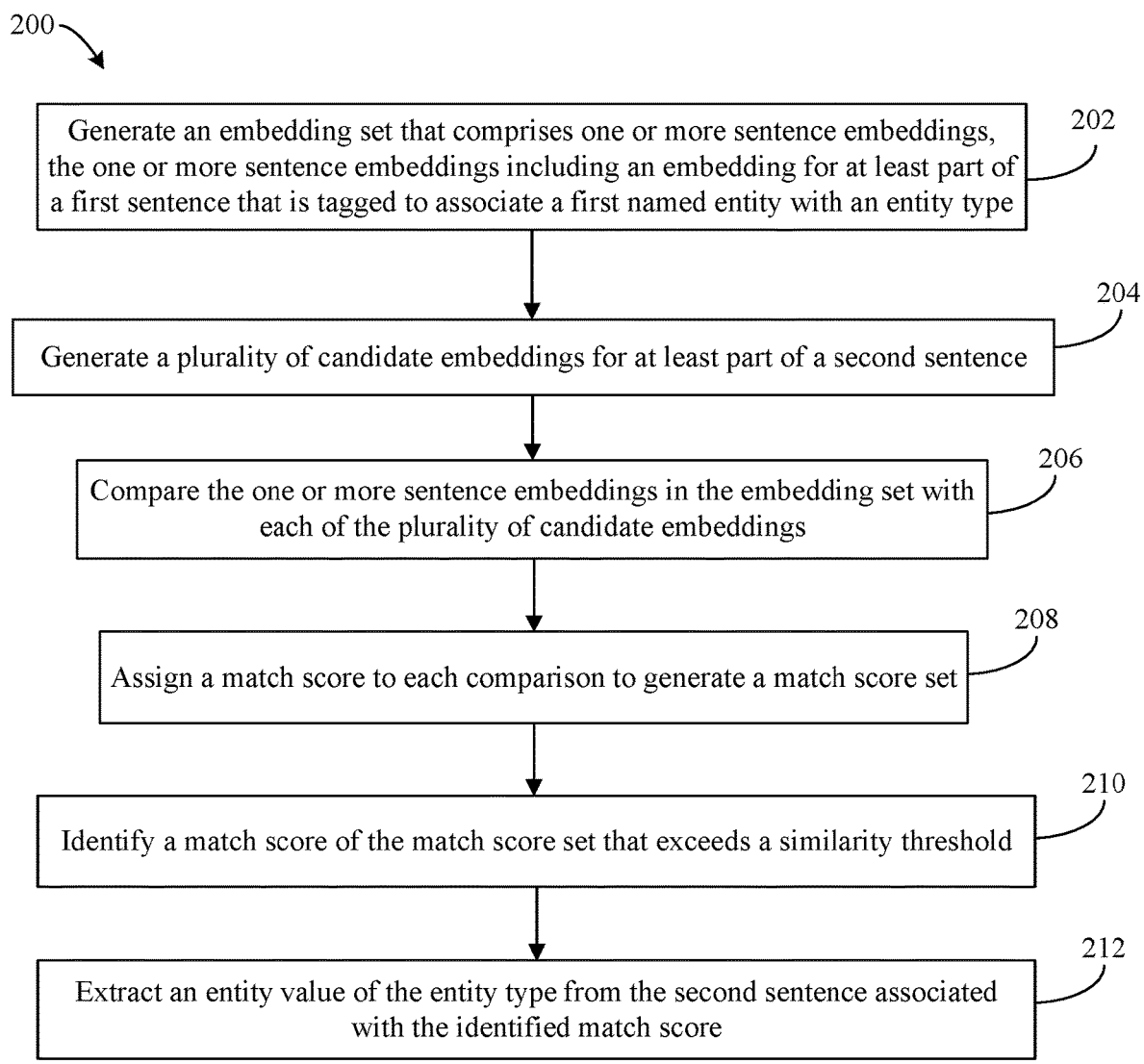
FIG. 2 shows a flowchart of a method for extracting an entity value from a sentence, according to an example embodiment.

Example-based extraction system 106 may operate in various ways to extract an entity value 110 and/or a slot value 112. For instance, example-based extraction system 106 may operate according to FIG. 2. FIG. 2 shows a flowchart 200 of a method for extracting an entity from a sentence, according to an example embodiment. For illustrative purposes, flowchart 200 and example-based extraction system 106 are described as follows with respect to FIG. 3.

Figure 3:
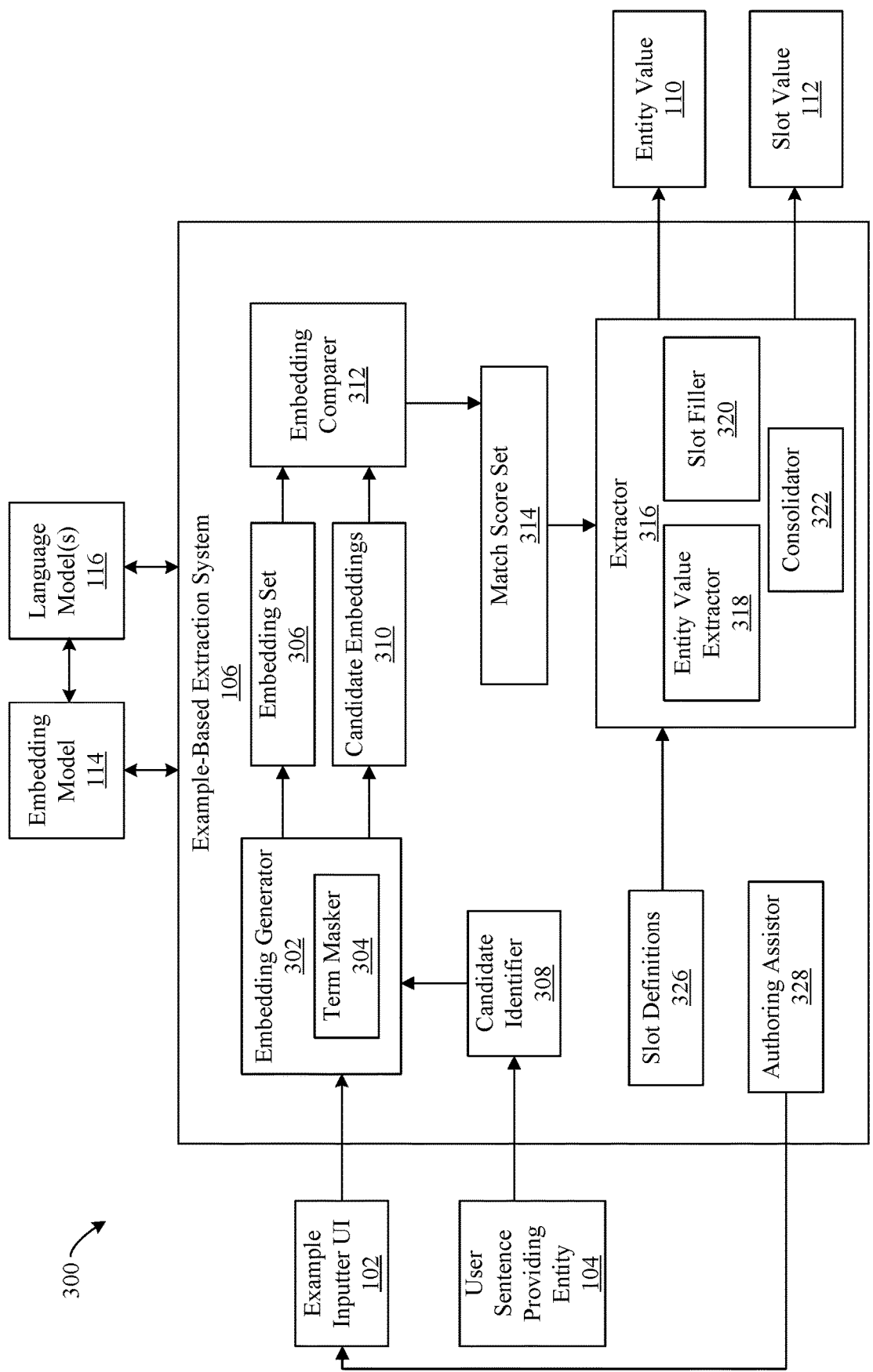
FIG. 3 shows a block diagram of a system for extracting entity values and/or slot values, according to an example embodiment.

FIG. 3 shows a block diagram of a system 300 for extracting entity values and/or slot values, according to an example embodiment. As shown in FIG. 3, system 300 includes an example implementation of example inputter UI 102, user sentence providing entity 104, example-based extraction system 106, entity value 110, slot value 112, embedding model 114, and language model(s) 116. Example-based extraction system 106 includes an embedding generator 302, embedding set 306, a candidate identifier 38, candidate embeddings 310, embedding comparer 312, a match score set 314, extractor 316, slot definitions 326, and an authoring assistor 328. Embedding generator 302 includes a term masker 304. As shown in FIG. 3, extractor 316 includes an entity value extractor 318, slot filler 320, and consolidator 322. Flowchart 200 and system 300 are described in further detail as follows.

Flowchart 200 of FIG. 2 begins with step 202. In step 202, an embedding set is generated that comprises one or more sentence embeddings, the one or more sentence embeddings including an embedding for at least part of a first sentence that is tagged to associate a first named entity with an entity type. For instance, with reference to FIG. 3, embedding generator 302 may be configured to generate embedding set 306 in accordance with implementations. Embedding set 306 may include one or more sentence embeddings, such as embeddings for example sentences obtained from example inputter UI 102. In examples, the one or more sentence embeddings in example set 306 may comprise one or more embeddings for at least part of an example sentence obtained from example inputter UI 102, as described below.

Example inputter UI 102 may comprise an interface through which a user, author, administrator, etc. may input one or more example sentences to define new entity types. For instance, an entity type may comprise a particular type (e.g., a category) of object that may be present in a sentence. For instance, an entity type may be defined to extract entity values, such as one or more terms, words, or phrases, within a given sentence. In an example, an entity type can be defined as a name, and entity values of that entity type may comprise names, such as "Bob" or "Alice." In another example, entity values such as "Seattle" or "Los Angeles" may be entity values of an entity type "location." These examples are illustrative only, and entity types and entity values may comprise any types or values that may be present in a sentence. For instance, entity types may include, but are not limited to, names, locations, organizations, airports, vehicles, form numbers, products, etc., and entity values may be any value associated with each such entity type.

In implementations, example inputter UI 102 may receive an input of one or more example sentences in which one or more named entities are associated with a respective entity type. The example sentence may be provided as a text-input (e.g., via a text-input field) in some implementations. In another implementation, the example sentence may be inputted via an audible input, such as a microphone and may be converted to a text-input through one or more speech-to-text conversion algorithms as will be appreciated by those skilled in the relevant arts. As described herein, an example sentence may comprise any type of example (e.g., representative) sentence illustrating how an entity value of an entity type may appear in a typical sentence. In other words, example sentences may provide examples of how sentences may recite certain types of terms, phrases, etc. during the ordinary usage in a given language.

Named entities (e.g., entity values) may be associated with an entity type using any one or more interactive UI elements, such as tagging, selecting, clicking on, boxing, highlighting, underling, labeling, etc. a named entity in an example sentence and associating the named entity with a user-identified entity type. The identified entity type may comprise a previously undefined entity type (e.g., newly defined), or may comprise an entity type that has been previously defined (e.g., using one or more example sentences, and/or via one or more rules used to identify entity values in a sentence). The entity type may be identified using any suitable UI element, including a text box, a drop-down menu, one or more radio buttons, icons, a listing, etc.

Embedding generator 302 may be configured to generate, for each of the one or more example sentences, an embedding for the example sentence. An embedding for a sentence may comprise a representation of one or more words (or sequences of words). In example embodiments, embedding generator 302 may generate an embedding (e.g., a vector representation in a multi-dimensional space) by applying embedding model 114 to one or more words. Embedding generator 302 may generate an embedding for an example sentence in various ways. In some implementations, embedding generator 302 may generate an embedding for an example sentence by masking out at least a portion of the sentence. For instance, term masker 304 may be configured to mask out the named entity value identified in the example sentence prior to embedding generator 302 generating an embedding. Term masker 304 may mask out the named entity by replacing the named entity with one or more predetermined or neutral characters, delete the named entity from the sentence, or in any other manner which may serve to neutralize the named entity in the sentence. As an example, if an example sentence inputted via example inputter UI 102 is "I am traveling to Seattle" and the word "Seattle" was associated with an entity type "location," term masker 304 may be configured to mask out "Seattle" with a series of neutral characters. In such an example, embedding generator 302 may be configured to generate an embedding for a masked sentence that comprises at least part of the inputted example sentence (e.g., an embedding for the masked sentence "I am travelling to ###"). It is also noted that while embedding generator 302 may generate an embedding for a sentence as a forward embedding (e.g., based on a forward sequence of words in the sentence, or as the sentence is typically interpreted in the ordinary course), embedding generator 302 may also generate an embedding for such a sentence as a backward embedding (e.g., based on a backward or reversed sequence of the words in the sentence).

Embedding generator 302 may also be configured to generate an embedding of part of an example sentence in other ways. For instance, embedding generator 302 may be configured to generate a forward embedding and/or a backward embedding of the named entity in the example sentence. As an example, if an example sentence is "I am traveling to Seattle tomorrow morning" and the word "Seattle" was associated with an entity type "location," embedding generator 302 may generate a forward embedding of the named entity "Seattle" that comprises the embedding of the sequence of words "I am travelling to," and a backward embedding for "Seattle" that comprises the embedding for "morning tomorrow." Forward and backward embeddings will be described in greater detail below with reference to FIGS. 5 and 6.

Embedding set 306 may comprise any number of embeddings for example sentences inputted via example inputter UI 102. For instance, embedding set may comprise a single embedding (e.g., an embedding for "I am traveling to ###"), may comprise a plurality of embeddings for the same sentence (e.g., one embedding for "I am traveling from Los Angeles to ###" and "I am traveling from ### to Seattle"), or may comprise a plurality of embeddings for a plurality of different entity types defined in one or more example sentences. For instance, where a user inputs several example sentences to define a new entity type, embedding set 306 may comprise a plurality of embeddings associated with each of the example sentences.

In some implementations, embedding set 306 may be stored locally to example-based extraction system, such as on a random-access memory (RAM) or other volatile memory device, a non-volatile storage (e.g., a hard disk drive, an optical disc, a flash drive, etc.). In some other implementations, embedding set 306 may be stored in one or more remotely located memory or storage devices, such as a memory or storage device in the cloud.

Referring back to FIG. 2, in step 204, a plurality of candidate embeddings for at least part of a second sentence are generated. For instance, with reference to FIG. 3, embedding generator 302 may be configured to generate a plurality of candidate embeddings 310 for a user sentence provided by user sentence providing entity 104. The user sentence may comprise any sequence of words, including but not limited to a phrase, a sentence, a query or question, a statement, etc. from which entity values of one or more entity types may be extracted. In some implementations, the user sentence may comprise an interaction directed to virtual agent 108 (e.g., a chat bot or the like) that may utilize one or more extracted values in determining an appropriate response to the user sentence providing entity 104.

In implementations, candidate identifier 308 may be configured to receive the user sentence provided by user sentence providing entity 104 to identify one or more candidate entity values in the user sentence. A candidate entity value may include any word or sequence of words in the user sentence that is identified as potentially comprising an entity value associated with one or more entity types. Candidate identifier 308 may extract such candidate entity values in various ways. In one implementation, part-of-speech (POS) tagging may be utilized to identify and/or filter candidate entity values in the user sentence. For instance, the user sentence may be tokenized at the boundaries of each word. As an example, the sentence "We are going to Los Angeles tomorrow" may be tokenized as including the following word: "We," "are," "going," "to," "Los," "Angeles," and "tomorrow." Candidate identifier 308 may utilize POS tagging to identify nouns, adjectives, cardinal numbers, symbols, etc. from the tokenized sentence. In this example, POS tagging may extract the tokens "We," "Los," and "Angeles" from the tokenized sentence. In a further implementation, candidate identifier 308 may also be configured to generate one or more n-grams up to a predetermined token length (e.g., a token length of 4 in an example) to identify the candidate entity values that may include candidate word spans longer than a single word from the user sentence. In such an example, candidate entity values may include "We," "Los", "Angeles," and "Los Angeles." In some other implementations, one or more rules or whitelisted terms may be utilized to identify potential candidate entity values (e.g., a predetermined listing, dictionary, repository, etc. of potential candidates). These examples are only intended to be illustrative, and other techniques for extracting potential candidate entity values from a user sentence may be implemented in accordance with example embodiments described herein, including any combination of various techniques.

Candidate embeddings 310 may comprise a plurality of candidate vector representations generated by applying embedding model 112 to at least part of the user sentence. In example implementations, embedding generator 302 may generate candidate embeddings 310 in a similar manner as described with respect to step 202. For instance, where term masker 304 may be employed to mask out a part of an example sentence prior to embedding generator 302 generating an embedding for that sentence, term masker 304 may similarly mask out a part of the user sentence provided by user sentence providing entity 104 prior to embedding generator 302 generating one or more embeddings for the candidate sentence. In implementations, the masked-out portions of the user sentence may comprise one or more candidate entity values identified by candidate identifier 308. In some instances, candidate embeddings 310 may be generated by masking different portions of the same user sentence. For instance, if the user sentence is "I am leaving Portland and traveling to Los Angeles" and candidate identifier 308 identified at least "Portland" and "Los Angeles" as candidate entity values, embedding generator 302 may generate a candidate embedding for the sentence "I am leaving ### and traveling to Los Angeles" and a candidate embedding for the sentence "I am leaving Portland and traveling to ###."

In other implementations, such as where embedding set 306 comprises a forward and/or backward embedding for one or more example sentences, embedding generator 302 may similarly be configured to generate a forward and/or backward embedding for the user sentence obtained from user sentence providing entity 104, in which the forward and backward embedding may be generated for each candidate entity value identified by candidate identifier 308, as will be described in greater detail below. It is noted and understood that such implementations are illustrative only, and other techniques of generating candidate embeddings, including but not limited to combining any of the techniques described herein, may be employed.

In this manner, embedding generator 302 may generate candidate embeddings 310 that include a plurality of embeddings (e.g., vector representations) that may represent the user sentence in various ways.

In step 206, the one or more sentence embeddings in the embedding set are compared with each of the plurality of candidate embeddings. For instance, embedding comparer 312 may compare the one or more of the example embeddings in embedding set 306 against each of the plurality of embeddings in candidate embeddings 310. In example embodiments, the comparison of embeddings in embedding set 306 and embeddings in candidate embeddings 310 may comprise a comparison of vectors, such as a cosine similarity comparison. This example, however, is only intended for illustrative purposes, and embedding comparer 312 may implement any other technique (or combination thereof) for comparing vector representations as appreciated by those skilled in the relevant arts, including but not limited to any other type of similarity measure or similarity function.

In step 208, a match score is assigned to each comparison to generate a match score set. For instance, with reference to FIG. 3, embedding comparer 312 may be configured to assign a match score to each comparison between an embedding of embedding set 306 and an embedding of candidate embeddings 310 to generate match score set 314. The match score assigned to each comparison may comprise a measure or ranking of similarity associated with each comparison.

In some implementations, the match score assigned to each comparison may be a combination of a plurality of measures. For instance, the match score may also comprise a span similarity score that measures the similarity between a word span (e.g., a named entity value) of an example sentence with a word span (e.g., the candidate entity value) of a user sentence by applying the word spans to language model(s) 116 (or any other model not expressly shown in FIG. 3). Embedding comparer 312 may also implement any other similarity measures to assign scores to each comparison.

In step 210, a match score of the match score set that exceeds a similarly threshold is identified. For instance, with reference to FIG. 3, entity value extractor 318 may be configured to identify a match score of match score set 314 that exceeds a similarity threshold. If a particular match score exceeds the similarity threshold, the match score may be added to a results listing of possible entity values that may be extracted from the user sentence, along with the corresponding entity type of which the possible entity value belongs.

In some instances, a plurality of match scores of match score set 314 may exceed a similarity threshold. For instance, if a word span (e.g., a candidate entity value) associated with one match score that exceeds the similarity threshold partially overlaps with another word span that also exceeds the similarity value for the same entity type, consolidator 322 may be configured to consolidate the results listing by retaining the word span with the higher match score in the results listing, while removing the word span with the lower match score. In a scenario where the match scores associated with the word spans are equal to each other, the word span with the longer length may be retained in the results listing, while the shorter word span is not retained. As an example, if candidate entity values "New York" and "New York City" both resulted in equal match scores that exceeded a similarity threshold for the entity type "location," consolidator 322 may be configured to retain "New York City" due to the longer length of the word span. In yet other scenarios, however, where the plurality of match scores of match score set 314 that exceed the similarity threshold for different entity types, each match score that exceeded the threshold may be retained on the results listing.

In step 212, an entity value of the entity type is extracted from the second sentence associated with the identified match score. For instance, with reference to FIG. 3, entity value extractor 318 may be configured to extract entity value 110 of the same entity type in the example sentence from the user sentence. Extracted entity value 110 may comprise the entity value (or values) in the results listing associated with the identified match score of the entity type that exceeds the similarity threshold.

It is noted and understood that although entity value extractor 318 may be configured to extract a single entity value of an entity type (e.g., an entity type as defined by one or more example sentences), entity value extractor 318 may be configured to extract a plurality of different entity values of the same entity type or even different entity types from the same user sentence in accordance with implementations described herein. For example, if an author defined an entity type "name" and an entity type "location" using one or more example sentences, and a user sentence stated, "Bob is traveling from Los Angeles to Seattle tomorrow," entity value extractor 318 may be configured extract "Bob" of the entity type "name," and both "Los Angeles" and "Seattle" of the entity type "location."

In this manner, a relatively small set of example sentences (e.g., one or a few non-exhaustive examples) may be used to illustrate how entity values of a custom-defined entity type are normally used in a sentence, and entity value extractor 318 may be configured to automatically extract one or more new entity values of the same entity type from previously unseen user sentences based on comparisons of embeddings for different portions of sentences as described herein.

As will be described in greater detail below, implementations are not limited to extracting entity values from user sentences. In some further implementations, as described with respect to FIG. 7, one or more slots (which may be defined as being associated with an underlying entity type) may be filled using similar techniques as described. As a result, implementations may enable both entity extraction and slot filling from user sentences in a flexible, efficient, and enhanced manner. Furthermore, techniques described herein may also improve the ease, adoptability, and functionality of virtual agent 108 (e.g., a chat bot, a customer service agent, or other entity) which may obtain extracted entity value 110 and/or extracted slot value 112 by enabling virtual agent 108 to simulate more meaningful and natural conversations with user sentence providing entity 104.

Figure 4:
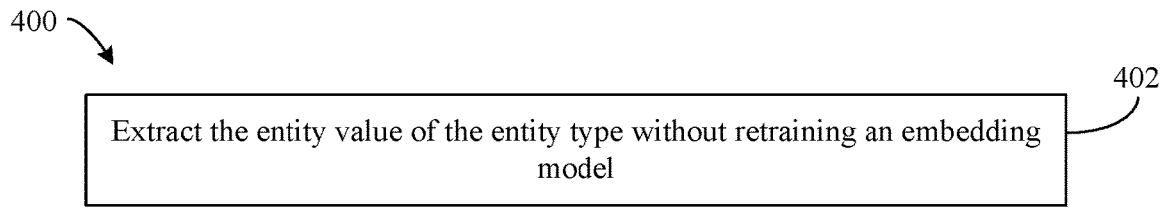
FIG. 4 shows a flowchart of a method for extracting an entity value of an entity type without retraining an embedding model, according to an example embodiment.

As described above, entity value extractor 318 may operate in various ways to extract an entity value of an entity type in a user sentence. For example, FIG. 4 shows a flowchart of a method for extracting an entity value of an entity type without retraining an embedding model, according to an example embodiment. In an implementation, the method of flowchart 400 may be implemented by embedding generator 302 and/or entity value extractor 318. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, an entity value of the entity type is extracted without retraining an embedding model. For instance, with respect to FIG. 3, entity value extractor 318 may be configured to extract entity value 110 of an entity type defined via one or more example sentences without retraining embedding model 114 being retrained. In other words, once embedding model 114 is configured to generate embeddings for a given language (e.g., based on language model(s) 116 or any other language data), embedding generator 302 may apply embedding model 114 to at least part of one or more example sentences as described to generate embedding set 306. Since embedding model 114 has already been configured to generate embeddings based on a given language, embedding generator 302 may use the same embedding model (i.e., without retraining the model) to generate candidate embeddings 310 for a user sentence to extract one or more entity values of the entity type defined though the example sentences. Accordingly, as described herein, example-based extraction system 106 may employ a training-free (e.g., a zero-shot learning) approach in implementations to extract entity values for entity types (or slot values for slot types, as described in greater detail below) using a small non-exhaustive and/or diverse set of examples sentence illustrating usage of entity values of the entity type.

For example, once a new entity type is defined using one or more example sentences as described herein, embedding set 306 may comprise one or more embeddings (e.g., vectors) that may represent how an entity value of the newly defined entity type may appear in the context of a larger sentence. Upon a user interacting with user sentence providing entity 104 to provide a user sentence from which entity values of that entity type may potentially be extracted, embedding generator 302 may generate embeddings for the user sentence in a similar manner that embeddings for the previously supplied example sentences were generated using the same embedding model.

In this manner, embedding comparer 312 may be enabled to compare the generated embeddings and entity value extractor 318 may be configured to extract one or more entity values of the entity type from the user sentence without reconfiguring or modifying embedding model 114. Since entity value extractor 318 may extract entity values of a newly defined entity type without retraining embedding model 114, entity value extractor 318 may extract entity values of the newly defined entity type in a quicker fashion (immediately or nearly immediately after embedding set 306 is generated) and with a reduced processor usage. Furthermore, since model retraining is not needed (at least with respect to the newly defined entity type), an overall reduction in memory and storage resources may also be obtained since a large repository of training data (which can be in the thousands) need not be generated and stored to enable a model to identify a new entity type. Rather, entity value extractor 318 may extract entity values of the newly defined entity type accurately with a relatively small set of example sentences (which may include only one or a few example sentences).

Figure 5:
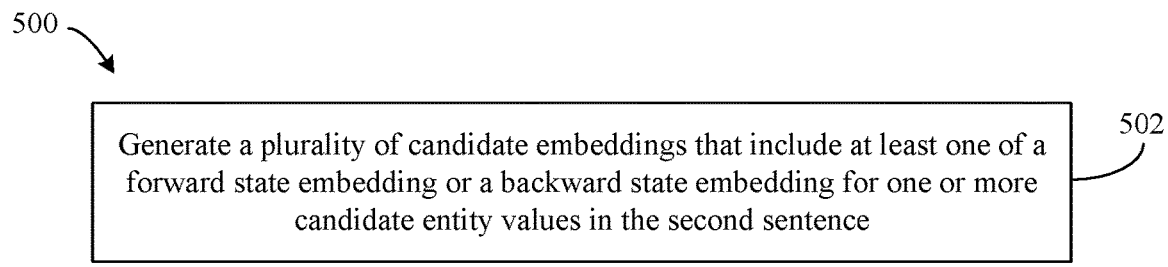
FIG. 5 shows a flowchart of a method for generating at least one of a forward or backward state embedding, according to an example embodiment.

As described above, embedding generator 302 may operate in various ways to generate embeddings of embedding set 306 and candidate embeddings 310. For example, FIG. 5 shows a flowchart of a method for generating at least one of a forward or backward state embedding, according to an example embodiment. In an implementation, the method of flowchart 500 may be implemented by embedding generator 302. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a plurality of candidate embeddings are generated that include at least one of a forward state embedding or a backward state embedding for one or more candidate entity values in the second sentence. For instance, with reference to FIG. 3, embedding generator 302 may be configured to generate candidate embeddings 310 for a user sentence that includes at least one of a forward state embedding or a backward state embedding for one or more candidate entity values identified by candidate identifier 308. As describe above, embedding generator 302 may apply embedding model 114 to an individual word (e.g., a token) or words to generate an embedding. In implementations, a forward state embedding for a candidate entity value of a user sentence may capture a forward context of the candidate entity value. Conversely, a backward state embedding for a candidate entity value of a user sentence may capture a backward context for a candidate entity value in the user sentence. In some implementations, each of the forward and backward state embeddings may generated by generating an embedding for each individual word appearing in a forward or backward context of the candidate entity value, and subsequently combining such embeddings to generate the forward or backward state embedding of the candidate entity value. In some implementations, the forward state embedding may comprise a combination of the forward context embeddings in a left-to-right sequence, while the backward state embedding may comprise a combination of the backward context embeddings in a right-to-left sequence (i.e., a reversed order).

Figure 6:
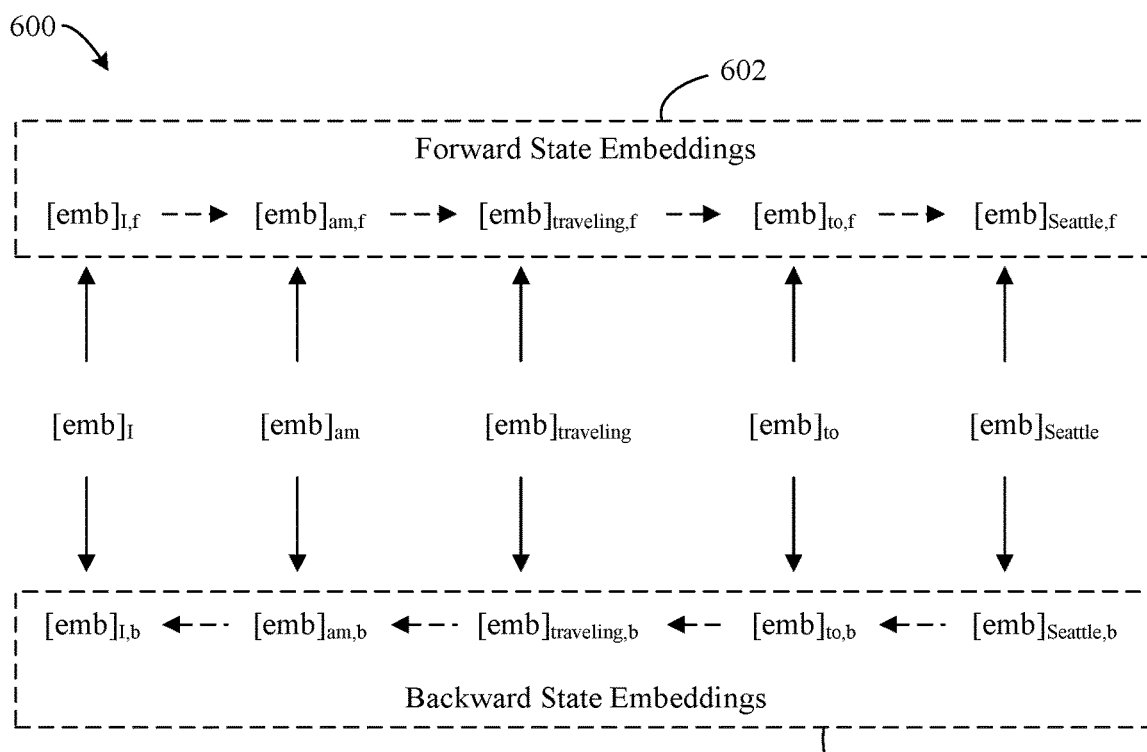
FIG. 6 shows example forward and backward state embeddings for an illustrative sentence, according to an example embodiment.

For instance, FIG. 6 shows example set 600 of forward state embeddings 602 and backward state embeddings 604 for an illustrative sentence, according to an example embodiment. As shown in FIG. 6, a user sentence may be "I am traveling to Seattle" in an illustration. In such an illustration, candidate identifier 308 may identify "Seattle" as a candidate entity value of entity type "location" in accordance with one or more techniques described herein (e.g., using a POS technique or the like). Upon identifying "Seattle" as a candidate entity value, embedding generator 302 may generate candidate embeddings 310 that include a forward and/or backward state embedding for the word "Seattle" in the user sentence. As shown in FIG. 6, forward state embeddings 602 for "Seattle" may include a combination of embeddings of the words in the user sentence that precede "Seattle." In other words, in this illustration, the forward state embedding for "Seattle" may include a combination of the embeddings for "I," "am," "traveling," and "to."

Conversely, in this illustration, the backward context of the term "Seattle" may include a combination of embeddings that follow the word "Seattle" in the user sentence. In the sentence illustrated in FIG. 6, because no words follow "Seattle," the backward state embedding may be determined to be "null." However, if candidate identifier 308 also identified the word "I" as a candidate entity value of another entity type (e.g., an entity type "person"), embedding generator 302 may be configured to generate a backward state embedding for the word "I," which would comprise a combination of the embeddings for the words "Seattle," "to," "traveling," and "am" in such a reversed order. It is noted that while it has been explained herein that a forward and backward state embedding may be generated in a forward and backward sequence, respectively, implementations are not intended to be limiting. It will be appreciated by those skilled in the relevant arts that a forward state embedding and/or a backward state embedding may be generated in any sequence.

It is also noted that any number of forward and/or backward state embeddings may be generated for a single user sentence. For instance, where candidate identifier 308 identifies multiple candidate entity values in a given user sentence (e.g., both "Los Angeles" and "Seattle" are identified as potential entity values of entity type "location"), embedding generator 302 may be configured to generate a forward and/or backward state embedding for each of the candidate entity values.

Although FIGS. 5 and 6 have been described in the context of user sentences (i.e., sentences provided by user sentence providing entity 104), embedding generator 302 may generate a forward and/or backward state embedding for an example sentence provided via example inputter UI 102 in a similar manner. For instance, instead of generating a forward and/or backward state embedding for a candidate entity value, embedding generator 302 may be configured to generate a forward and/or backward embedding for the named entity value tagged in the example sentence.

An illustrative example of how such bi-directional token state embeddings may be implemented is described. In the illustration, embedding generator 302 may generate a bi-directional token state embedding using a deep learning model (e.g., embedding model 114) may be generated for each example sentence inputted via example inputter UI 102. As described earlier, the bi-directional token state embeddings may include one or more of a forward or backward state embedding surrounding a named entity value tagged in each example sentence. In other words, embedding generator 302 may generate a forward state embedding based on a combination of the embeddings in a forward context before the tagged entity value in the example sentence, and a backward state embedding based on a combination of the embeddings in a backward context following the tagged entity value in the example sentence. Where there is no word before or after a particular named entity value in an example sentence, the forward or backward context may be considered "null" as previously described.

Upon receiving a user sentence, embedding generator 302 may generate a bi-directional token state embedding for the user query as explained above. For instance, for each candidate entity value identified by candidate identifier 308, embedding generator 302 may generate one or more of a forward or backward state embedding (which may be "null" if there is no token before or after the candidate entity value). Embedding comparer 312 may compare each forward and backward state embedding in embedding set 306 (comprising example embeddings) with each forward and backward state embedding of candidate embeddings 310 (comprising embeddings for each candidate entity value) and may assign a match score to each comparison as described. In some implementations, the comparison may be skipped in instances where one of the forward or backward state embedding is null. If both the forward and backward state embedding comparisons skipped, the candidate is considered to not be a match and a match score may not be assigned to the comparison. If only one of forward or backward state embedding comparison is skipped, embedding comparer 312 may assign the match score based on the comparison that is not skipped (which may later be evaluated against a similarity threshold, as described above). In instances where neither the forward state or backward state embedding is skipped, embedding comparer 312 may be configured to average a match score assigned to the forward state embedding comparison and backward state embedding comparison when evaluating the candidate entity value's match score against a similarity threshold. Based on evaluation of the scores in match score set 314, entity value extractor 318 may extract one or more entity values from the user sentence.

As described above, extractor 316 may also be configured to extract a slot value of a slot type from a user sentence. In implementations, a slot type may be defined as a subsidiary of an entity type using one or more example sentences. For instance, a slot type "origin" and a slot type "destination" may be defined as belonging to an entity type "location" via tagging, highlighting, etc. in example inputter UI 102. As an illustration, an example sentence inputted via example inputter UI 102 may be "I am traveling from Los Angeles to Seattle," where "Los Angeles" and "Seattle" may both be tagged as entity values of an entity type "location." In addition, "Los Angeles" may be tagged as a slot value for the slot type "origin," while "Seattle" may be tagged as a slot value for the slot type "destination." In implementations, the association between a slot type and an entity type as defined via one or more example sentences may be stored as slot definitions 326, which may be provided to extractor 316. As will be described in greater detail below, slot filler 320 may utilize similar techniques as described herein to extract slot values of a slot type to increase the granularity in which objects may be extracted from a user sentence.

Figure 7:
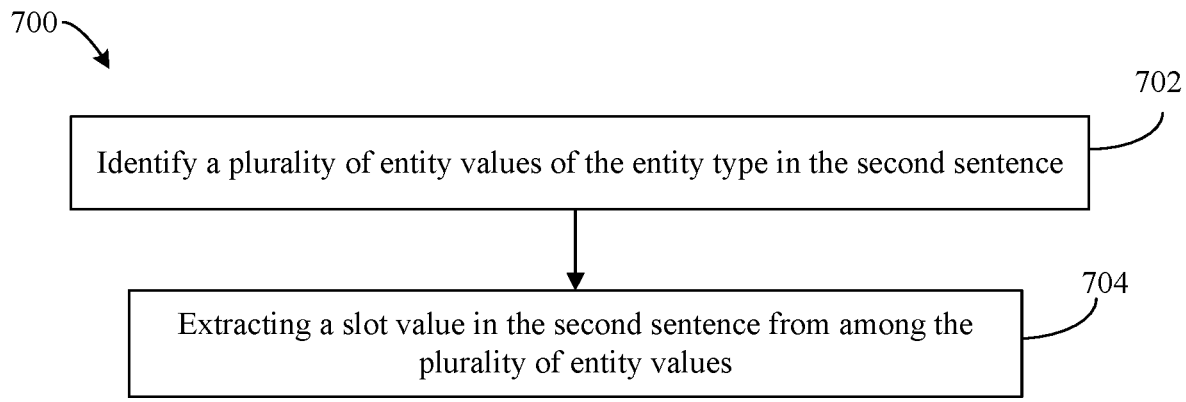
FIG. 7 shows a flowchart of a method for identifying a slot value in a sentence, according to an example embodiment.

For example, FIG. 7 shows a flowchart of a method for identifying a slot value in a sentence, according to an example embodiment. In an implementation, the method of flowchart 700 may be implemented by slot filler 320. FIG. 7 is described with continued reference to FIG. 3. Other structural and operational implementations will be apparent to persons skilled in the relevant art(s) based on the following discussion regarding flowchart 700 and system 300 of FIG. 3.

Flowchart 700 begins with step 702. In step 702, a plurality of entity values of the entity type are identified in the second sentence. For instance, with reference to FIG. 3, slot filler 320 may identify each entity value 110 that was extracted from a user sentence provided by user sentence providing entity 104 as slot candidate values. While each entity value 110 may be extracted from a user sentence in accordance with techniques described herein (e.g., using an embedding model), slot filler 320 may also be configured to identify any other entity values extracted from the user sentence using any other entity extraction techniques appreciated to those skilled in the relevant arts (e.g., rule-based entity value extraction techniques, classification models, etc.). In other words, candidate slot values may comprise any entity value extracted from a user sentence, and is not limited to entity values extracted using any particular technique.

In step 704, a slot value in the second sentence is extracted from among the plurality of entity values. For instance, with reference to FIG. 3, slot filler 320 may be configured to extract slot value 112 from a user sentence from among the plurality of entity values previously extracted from the user sentence. In implementations, example-based extraction system 106 may operate in a similar manner as described earlier with respect to entity value extraction to extract one or more slot values. For instance, while candidate identifier 308 may identify candidate entity values from the user sentence and provide such candidate entity values to embedding generator 302 for entity extraction, candidate identifier 308 may also be configured to provide candidate slot values described above to embedding generator for slot value extraction. In other words, instead of embedding generator 302 generating embeddings candidate embeddings 310 based on candidate entity values, embedding generator 302 may generate candidate embeddings 310 based on candidate slot values (e.g., by applying embedding model 114 to a sentence in which the candidate slot values is masked, and/or generating a forward and/or backward embedding for each candidate slot value in the user sentence).

Stated differently, slot types may be defined in slot definitions 326 as having an underlying entity type that may constrain the candidate values. Thus, instead of using candidate entity values (e.g., based on POS or other techniques) as described above, slot value extraction may be performed by limiting the candidate values to the previously extracted entity values that correspond to the slot type's underlying entity type. As an illustration, if a user sentence reads "I am flying to Washington, D.C. from New York City," entity value extractor 318 may extract "Washington, D.C." and "New York City" as belonging to the entity type "location" as described herein. In such an example, slot filler 320 may attempt to fill an "origin" and "destination" slot type belonging to the entity type "location" by causing embedding generator 302 to generate candidate embeddings based only on the previously extracted entity values ("Washington, D.C." and "New York City"). Upon generating embeddings for such candidate slot values, embedding comparer 312 may compare the generated embeddings with embeddings in embedding set 306 using similar techniques as described above to generate match score set 314 and slot filler 320 may extract an appropriate slot value 112 of a slot type based on an evaluation of match scores against a similarity threshold. Accordingly, continuing with the illustration above, slot filler 320 may be configured to automatically extract "New York City" as belonging to the slot type "origin," and "Washington, D.C." as belonging to the slot type "destination," both of which are associated with an underlying entity type "location."

Figure 8:
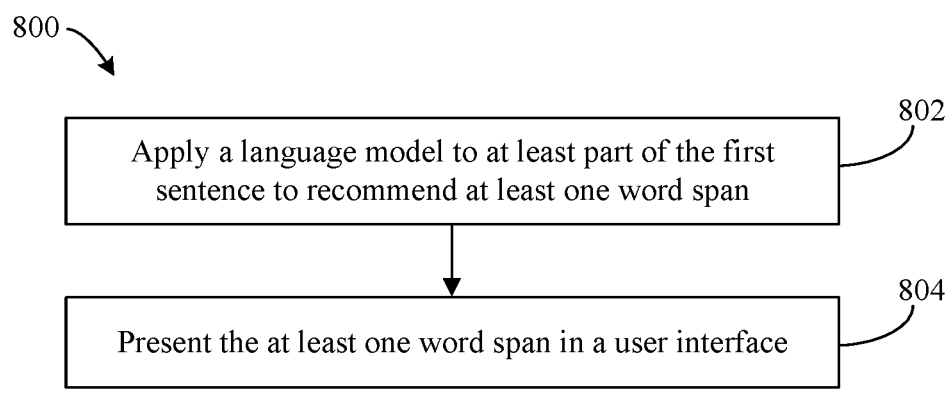
FIG. 8 shows a flowchart of a method for recommending a word span by applying a language model to a part of a sentence, according to an example embodiment.

In some implementations, example-based extraction system 106 may be configured to providing additional example word spans to a user of example inputter UI 102. For instance, FIG. 8 shows a flowchart of a method for recommending a word span by applying a language model to a part of a sentence, according to an example embodiment. In an implementation, the method of flowchart 800 may be implemented by authoring assistor 328. FIG. 8 is described with continued reference to FIG. 3. Other structural and operational implementations will be apparent to persons skilled in the relevant art(s) based on the following discussion regarding flowchart 800 and system 300 of FIG. 3.

In step 802, a language model is applied to at least part of the first sentence to recommend at least one word span associated with the entity type. For instance, with reference to FIG. 3, authoring assistor 328 may be configured to apply language model(s) 116 to recommend at least one word span associated with the entity type present in the example sentence. In an illustration discussed previously, an example sentence may define an entity type "location" using a sentence such as "I am travelling to Seattle," in which the term "Seattle" was tagged as belonging to the entity type "location." In some instances, the example sentence may also define one or more slot types as being associated with an underlying entity type. In implementations, authoring assistor 328 may apply one or more language models to recommend new entity values (or slot values) similar to the term "Seattle" (e.g., Los Angeles, N.Y., Miami, etc., or other destinations, such as Texas, La., etc.) such that an author may input additional example sentences with greater ease.

Language model(s) 116 may comprise any number of models that may be configured to take as an input a context (e.g., part of a sentence), and produce scores based on thereon. In some implementations, language model(s) 116 may receive a sentence as one or more embeddings, such as one or more token-level embeddings or a combination thereof (e.g., a sentence embedding). Language model(s) 116 may be trained via any one or more repositories of language data, including but not limited to books, academic literature, dictionaries, encyclopedias, data available on the Internet, newspapers, etc. In implementations, authoring assistor 328 may apply a single language model to a part of an example sentence, or may apply a combination of language models.

In some instances, language model(s) 116 may also be configured to generate a fluency or probability score that represents the probability that the inputted sequence of words (which may include a part of a sentence or a whole sentence) would occur in the language in which the model is trained. In other words, a higher fluency or probability score indicates a higher likelihood that that the sequence of words is natural or fluent (e.g., a well-constructed sentence) in a given language. In one illustration, a language model may generate a higher score for the sentence "I want to fly from Seattle to NY" than a sentence such as "Fly Seattle New York tomorrow." Probability or fluency scores may also include joint probability score that is a product of a plurality of conditional probability scores as modeled in language model(s) 116. For instance, for a sentence such as "I want to travel to Seattle," language model(s) 116 may determine individual probabilities for "want" given the context "I,", "to" given the context "I want," "travel" given the context "I want to," and so on. By multiplying (or combining in any other suitable manner) each probability score, a joint probability score for the entire sentence "I want to travel to Seattle" may be derived.

Language model(s) 116 may also be applied to a part of a sentence to identify the next most likely word in the sentence based on a given language that the model(s) is trained. For example, if an entity type "location" was previously defined via one or more example sentences via example inputter UI 102, authoring assistant 328 may extract a prefix and/or suffix in the sentence and apply language model(s) 116 to identify one or more word spans (which may comprise an individual word or a sequence of words) as the next likely word. In some instances, language model(s) 116 may also generate a score for a plurality of likely words that may follow the inputted part of the sentence. In this manner, authoring assistant 328 may be configured to recommend one or more word spans to associated with an entity type (or slot type) to assist a user authoring example sentences.

A description is provided below that explains how authoring assistant 328 may operate in an illustrative scenario to recommend one or more word spans in a sentence. In the illustration, authoring assistant 328 may use one or more models, such as a unidirectional language model (e.g., Generative Pre-Training (e.g., GPT or GPT-2) to obtain a phrase embedding for a prefix phrase of an example sentence (e.g., the phrase before the tagged word span). Authoring assistant 328 may also be configured to utilize one or more other models, such as a bidirectional deep learning model (Bidirectional Encoder Representations from Transformers, or BERT) to obtain phrase embeddings for both a prefix and a suffix (e.g., the phrase after the tagged span).

Authoring assistant 328 may cause the prefix embedding (or both the prefix and suffix embeddings) to be passed through language model(s) 116 to obtain the most probable J candidate words from the vocabulary that the language model(s) 116 is trained (e.g., constructed using a given corpus of documents), where J is any integer greater than one. Authoring assistant 328 may generate sequences of words (e.g., trigrams) using each of the J words as center words from the given sentence. Authoring assistant 328 may sort each of the trigrams using a fluency or probability score derived from language model(s) 116, such as a joint probability score. A number of top-ranked trigrams (e.g., K trigrams) may be extracted from the sorted list, thereby providing K center words that may be used in an example sentence.

In some implementations, authoring assistant 328 may be configured to further sort the K center words, by replacing the tagged phrase in an example sentence with each of the K center words, and sorting each sentence (e.g., in descending order) based on a fluency or probability score (e.g., one or more conditional probability scores) of the suffix phrase given the prefix phrase and the center word. In other words, authoring assistant may apply language model(s) 116 to each of a plurality of sentences with the K center word inserted to obtain a set of scores for the sentences and sort such words based on the scores. In this manner, authoring assistant 328 may return the K sorted words as additional words (or word spans) that may be useful for a user of example inputter UI 102 when providing additional example sentences to example-based extraction system 106.

In step 804, the at least one word span is presented in a user interface. For instance, with reference to FIG. 3, authoring assistant 328 may be configured to present (or provide for presentation) the one or more word spans (e.g., K sorted words) in example inputter UI 102. The one or more word spans may be presented as one or more additional example word spans that are similar to the tagged entity value. In some implementations, the one or more word spans may be presented by displaying each of the word spans, and/or displaying additional example sentences comprising the word spans in the user interface. Example inputter UI 102 may comprise one or more interactive UI elements, such as one or more selectable checkboxes, radio buttons, drag-and-drop elements, etc. enabling an author to select at least one word span (or sentence comprising the word span) as an additional example sentence to provide to example-based extraction system 106. In some implementations, example inputter UI 102 may provide one or elements enabling a user to select a plurality of word spans (or sentences including such word spans) such that additional example sentences may be provided to example-based extraction system 106 as a batch.

In this manner, authoring assistant 328 may allow for a reduction in time spent by an author to craft additional high-quality examples when defining entity types and/or slots. Furthermore, by providing additional entity values (or slot values) in example inputter UI 102 that may be easily selectable to create additional example sentences, the performance of example-based extraction system 106 may be further improved. For instance, as discussed earlier, embedding generator 302 may generate one or more embeddings for each example sentence (whether provided via a recommendation as described herein or manually inputted), which may be stored in embedding set 306 and compared with candidate embeddings 310 to extract entity and/or slot values from a user sentence. Therefore, by increasing the number of high-quality example sentences for which embeddings are included in embedding set 306, the number of possible example embeddings that may be compared with each of the plurality of candidate embeddings increases, thereby increasing the accuracy at which example-based extraction system 106 may perform to extract an entity and/or slot value from a user sentence.

III. Example Mobile and Stationary Device Embodiments

Example inputter UI 102, user sentence providing entity 104, example-based extraction system 106, virtual agent 108, embedding model 114, language model(s) 116, embedding generator 302, term masker 304, embedding set 306, candidate identifier 308, candidate embeddings 310, embedding comparer 312, match score set 314, extractor 316, entity value extractor 318, slot filler 320, consolidator 322, slot definitions 326, authoring assistant 328, flowchart 200, flowchart 400, flowchart 500, flowchart 700, and/or flowchart 800 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of example inputter UI 102, user sentence providing entity 104, example-based extraction system 106, virtual agent 108, embedding model 114, language model(s) 116, embedding generator 302, term masker 304, embedding set 306, candidate identifier 308, candidate embeddings 310, embedding comparer 312, match score set 314, extractor 316, entity value extractor 318, slot filler 320, consolidator 322, slot definitions 326, authoring assistant 328, flowchart 200, flowchart 400, flowchart 500, flowchart 700, and/or flowchart 800 may be implemented separately or together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
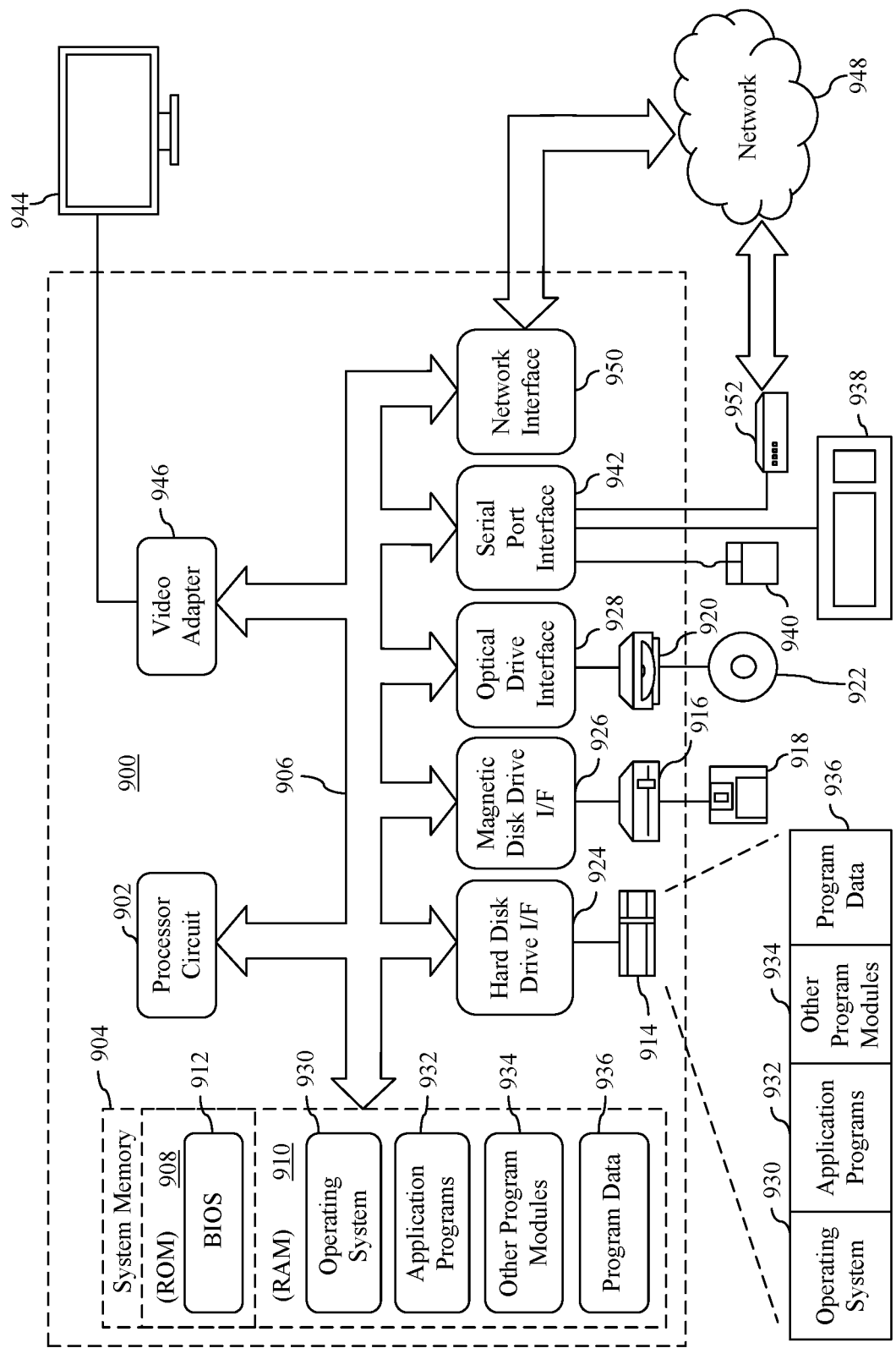
FIG. 9 shows a block diagram of an example computing device that may be used to implement example embodiments.

FIG. 9 depicts an exemplary implementation of a computing device 900 in which example embodiments may be implemented. For example, any of example inputter UI 102, user sentence providing entity 104, example-based extraction system 106, virtual agent 108, embedding model 114, language model(s) 116, embedding generator 302, term masker 304, embedding set 306, candidate identifier 308, candidate embeddings 310, embedding comparer 312, match score set 314, extractor 316, entity value extractor 318, slot filler 320, consolidator 322, slot definitions 326, and/or authoring assistor 328 may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Example embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random-access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing example inputter UI 102, user sentence providing entity 104, example-based extraction system 106, virtual agent 108, embedding model 114, language model(s) 116, embedding generator 302, term masker 304, embedding set 306, candidate identifier 308, candidate embeddings 310, embedding comparer 312, match score set 314, extractor 316, entity value extractor 318, slot filler 320, consolidator 322, slot definitions 326, authoring assistor 328, flowchart 200, flowchart 400, flowchart 500, flowchart 700, and/or flowchart 800 (including any suitable step of flowcharts 200, 400, 500, 700, or 800) and/or further example embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of example embodiments described herein. Accordingly, such computer programs represent controllers of the computing device 900.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system is disclosed herein. The system includes: a processor; and a memory device that stores program code configured to be executed by the processor, the program code comprising: an embedding generator configured to: generate an embedding set that comprises one or more sentence embeddings, the one or more sentence embeddings including an embedding for at least part of a first sentence that is tagged to associate a first named entity in the first sentence with an entity type, and generate a plurality of candidate embeddings for at least part of a second sentence; an embedding comparer configured to: compare the one or more sentence embeddings in the embedding set with each of the plurality of candidate embeddings, and assign a match score to each comparison to generate a match score set; and an entity value extractor configured to: identify a match score of the match score set that exceeds a similarity threshold, and extract an entity value of the entity type from the second sentence associated with the identified match score.

In one implementation of the foregoing system, the embedding for at least part of the first sentence comprises a first vector representation generated by applying an embedding model to the at least part of the first sentence, and each of the plurality of candidate embeddings comprises a candidate vector representation generated by applying the embedding model to the at least part of the second sentence.

In another implementation of the foregoing system, the entity value extractor is configured to extract the entity value of the entity type without retraining the embedding model.

In another implementation of the foregoing system, the embedding is generated by masking a portion of the first sentence, and the plurality of candidate embeddings are generated by masking different portions of the second sentence.

In another implementation of the foregoing system, the plurality of candidate embeddings include at least one of a forward state embedding or a backward state embedding for one or more candidate entity values in the second sentence.

In another implementation of the foregoing system, the system further includes a slot filler configured to: identify a plurality of entity values of the entity type in the second sentence, and extract a slot value in the second sentence from among the plurality of entity values.

In another implementation of the foregoing system, the system further includes an authoring assistor configured to: apply a language model to at least part of the first sentence to recommend at least one word span associated with the entity type; and present the at least one word span in a user interface.

In another implementation of the foregoing system, the embedding set comprises a plurality of sentence embeddings generated from a plurality of tagged sentences for the entity type, and the embedding comparer is configured to compare each of the plurality of sentence embeddings in the embedding set with each of the plurality of candidate embeddings.

A method is disclosed herein. The method includes: generating an embedding set that comprises one or more sentence embeddings, the one or more sentence embeddings including an embedding for at least part of a first sentence that is tagged to associate a first named entity in the first sentence with an entity type; generating a plurality of candidate embeddings for at least part of a second sentence; comparing the one or more sentence embeddings in the embedding set with each of the plurality of candidate embeddings; assigning a match score to each comparison to generate a match score set; identifying a match score of the match score set that exceeds a similarity threshold; and extracting an entity value of the entity type from the second sentence associated with the identified match score.

In one implementation of the foregoing method, the embedding for at least part of the first sentence comprises a first vector representation generated by applying an embedding model to the at least part of the first sentence, and each of the plurality of candidate embeddings comprises a candidate vector representation generated by applying the embedding model to the at least part of the second sentence.

In another implementation of the foregoing method, the extracting the entity value comprises extracting the entity value of the entity type without retraining the embedding model.

In another implementation of the foregoing method, the embedding is generated by masking a portion of the first sentence, and the plurality of candidate embeddings are generated by masking different portions of the second sentence.

In another implementation of the foregoing method, the plurality of candidate embeddings include at least one of a forward state embedding or a backward state embedding for one or more candidate entity values in the second sentence.

In another implementation of the foregoing method, the method further includes: identifying a plurality of entity values of the entity type in the second sentence; and extracting a slot value in the second sentence from among the plurality of entity values.

In another implementation of the foregoing method, the method further includes: applying a language model to at least part of the first sentence to recommend at least one word span associated with the entity type; and presenting the at least one word span in a user interface.

In another implementation of the foregoing method, the embedding set comprises a plurality of sentence embeddings generated from a plurality of tagged sentences for the entity type, and said comparing the one or more sentence embeddings in the embedding set with each of the plurality of candidate embeddings comprises comparing each of the plurality of sentence embeddings in the embedding set with each of the plurality of candidate embeddings.

A computer-readable memory is disclosed herein. The computer-readable memory has computer program code recorded thereon that when executed by at least one processor causes the at least one processor to perform a method comprising: generating an embedding set that comprises one or more sentence embeddings, the one or more sentence embeddings including an embedding for at least part of a first sentence that is tagged to associate a first named entity in the first sentence with an entity type; generating a plurality of candidate embeddings for at least part of a second sentence; comparing the one or more sentence embeddings in the embedding set with each of the plurality of candidate embeddings; assigning a match score to each comparison to generate a match score set; identifying a match score of the match score set that exceeds a similarity threshold; and extracting an entity value of the entity type from the second sentence associated with the identified match score.

In one implementation of the foregoing computer-readable memory, the embedding is generated by masking a portion of the first sentence, and the plurality of candidate embeddings are generated by masking different portions of the second sentence.

In another implementation of the foregoing computer-readable memory, the plurality of candidate embeddings include at least one of a forward state embedding or a backward state embedding for one or more candidate entity values in the second sentence.

In another implementation of the foregoing computer-readable memory, the method further includes: applying a language model to at least part of the first sentence to recommend at least one word span associated with the entity type; and presenting the at least one word span in a user interface.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the disclosed subject matter should not be limited by any of the above-described example embodiments, but should be defined only in accordance with the following claims and their equivalents.

What is claimed is:

1. A system, comprising:
a processor; and
a memory device that stores program code configured to be executed by the processor, the program code comprising:
an embedding generator configured to:
receive, via a user interface, a first sentence, an identification of a first named entity in the first sentence, and an entity type associated with the first named entity,
mask the first named entity identified via the user interface in the first sentence to generate a masked first sentence,
generate an embedding set that comprises a plurality of sentence embeddings generated from a plurality of tagged sentences for the entity type, the plurality of sentence embeddings including one or more sentence embeddings for at least part of the masked first sentence,
extract a candidate entity value from a second sentence received by a virtual agent,
mask the candidate entity value in the second sentence to generate a masked second sentence, and
generate a plurality of candidate embeddings for at least part of the masked second sentence, the plurality of candidate embeddings comprising:
a first candidate embedding for a first subset of terms of the masked second sentence that follow the masked candidate entity value in a forward order, and
a second candidate embedding for a second subset of terms of the masked second sentence that precede the masked candidate entity value in a reverse order;
an embedding comparer configured to:
compare each of the plurality of sentence embeddings in the embedding set with each of the plurality of candidate embeddings, and
assign a match score to each comparison to generate a match score set; and
an entity value extractor configured to:
identify a match score of the match score set that exceeds a similarity threshold, and
extract an entity value of the entity type from the second sentence associated with the identified match score.

2. The system of claim 1, wherein an embedding of the embedding set for at least part of the masked first sentence comprises a first vector representation generated by applying an embedding model to the at least part of the masked first sentence, and each of the plurality of candidate embeddings comprises a candidate vector representation generated by applying the embedding model to the at least part of the masked second sentence.

3. The system of claim 2, wherein the entity value extractor is configured to extract the entity value of the entity type without retraining the embedding model.

4. The system of claim 1, wherein the plurality of candidate embeddings are generated by masking different portions of the second sentence.

5. The system of claim 1, wherein the plurality of candidate embeddings include at least one of a forward state embedding or a backward state embedding for the candidate entity value in the second sentence.

6. The system of claim 1, further comprising a slot filler configured to:
identify a plurality of entity values of the entity type in the second sentence, and
extract a slot value in the second sentence from among the plurality of entity values.

7. The system of claim 1, further comprising:
an authoring assistor configured to:
apply a language model to at least part of the first sentence to recommend at least one word span associated with the entity type; and
present the at least one word span in a user interface.

8. A method, comprising:
receiving, via a user interface, a first sentence, an identification of a first named entity in the first sentence, and an entity type associated with the first named entity;

masking the first named entity identified via the user interface in the first sentence to generate a masked first sentence;

generating an embedding set that comprises a plurality of sentence embeddings generated from a plurality of tagged sentences for the entity type, the plurality of sentence embeddings including one or more sentence embeddings for at least part of the masked first sentence;

extracting a candidate entity value from a second sentence received by a virtual agent;

masking the candidate entity value in the second sentence to generate a masked second sentence;

generating a plurality of candidate embeddings for at least part of the masked second sentence, the plurality of candidate embeddings comprising:
- a first candidate embedding for a first subset of terms of the masked second sentence that follow the masked candidate entity value in a forward order, and
- a second candidate embedding for a second subset of terms of the masked second sentence that precede the masked candidate entity value in a reverse order;

comparing each of the plurality of sentence embeddings in the embedding set with each of the plurality of candidate embeddings;

assigning a match score to each comparison to generate a match score set;

identifying a match score of the match score set that exceeds a similarity threshold; and extracting an entity value of the entity type from the second sentence associated with the identified match score.

9. The method of claim 8, wherein an embedding of the embedding set for at least part of the masked first sentence comprises a first vector representation generated by applying an embedding model to the at least part of the masked first sentence, and each of the plurality of candidate embeddings comprises a candidate vector representation generated by applying the embedding model to the at least part of the masked second sentence.

10. The method of claim 9, wherein said extracting the entity value comprises extracting the entity value of the entity type without retraining the embedding model.

11. The method of claim 8, wherein the plurality of candidate embeddings are generated by masking different portions of the second sentence.

12. The method of claim 8, wherein the plurality of candidate embeddings include at least one of a forward state embedding or a backward state embedding for the candidate entity value in the second sentence.

13. The method of claim 8, further comprising:
identifying a plurality of entity values of the entity type in the second sentence; and
extracting a slot value in the second sentence from among the plurality of entity values.

14. The method of claim 8, further comprising:
applying a language model to at least part of the first sentence to recommend at least one word span associated with the entity type; and
presenting the at least one word span in a user interface.

15. A computer-readable storage medium having computer program code recorded thereon that when executed by at least one processor causes the at least one processor to perform a method comprising:

receiving, via a user interface, a first sentence, an identification of a first named entity in the first sentence, and an entity type associated with the first named entity;

masking the first named entity identified via the user interface in the first sentence to generate a masked first sentence;

generating an embedding set that comprises a plurality of sentence embeddings generated from a plurality of tagged sentences for the entity type, the plurality of sentence embeddings including one or more sentence embeddings for at least part of the masked first sentence;

extracting a candidate entity value from a second sentence received by a virtual agent;

masking the candidate entity value in the second sentence to generate a masked second sentence;

generating a plurality of candidate embeddings for at least part of the masked second sentence, the plurality of candidate embeddings comprising:
- a first candidate embedding for a first subset of terms of the masked second sentence that follow the masked candidate entity value in a forward order, and
- a second candidate embedding for a second subset of terms of the masked second sentence that precede the masked candidate entity value in a reverse order;

comparing each of the plurality of sentence embeddings in the embedding set with each of the plurality of candidate embeddings;

assigning a match score to each comparison to generate a match score set;

identifying a match score of the match score set that exceeds a similarity threshold; and extracting an entity value of the entity type from the second sentence associated with the identified match score.

16. The computer-readable storage medium of claim 15, wherein the plurality of candidate embeddings are generated by masking different portions of the second sentence.

17. The computer-readable storage medium of claim 15, wherein the plurality of candidate embeddings include at least one of a forward state embedding or a backward state embedding for the candidate entity value in the second sentence.

18. The computer-readable storage medium of claim 15, further comprising:
applying a language model to at least part of the first sentence to recommend at least one word span associated with the entity type; and
presenting the at least one word span in a user interface.

19. The computer-readable storage medium of claim 15, wherein said extracting the entity value comprises extracting the entity value of the entity type without retraining the embedding model.

20. The computer-readable storage medium of claim 15, further comprising:
identifying a plurality of entity values of the entity type in the second sentence; and
extracting a slot value in the second sentence from among the plurality of entity values.

* * * * *